UNITED STATES PATENT OFFICE.

ALFRED RUTTER, OF MENTONE, VICTORIA, AUSTRALIA.

PROCESS OF STERILIZING MILK, CREAM, BEVERAGES, AND OTHER ALIMENTARY SUBSTANCES.

1,140,717.  Specification of Letters Patent.  Patented May 25, 1915.

No Drawing.  Application filed December 19, 1913.  Serial No. 807,692.

*To all whom it may concern:*

Be it known that I, ALFRED RUTTER, A. R. C. Sc., a subject of the King of Great Britain, residing at "Marlton," Florence street, Mentone, in the State of Victoria, Australia, analytical chemist, have invented a Process of Sterilizing Milk, Cream, Beverages, and other Alimentary Substances, of which the following is a specification.

This invention has for its object the destruction of the micro-organisms in milk, cream and other alimentary substances and beverages in such a manner as to economize the cost, increase the utility and widen the scope of the process and enable the substance treated to be received by the consumer in a sterilized condition and free from contamination and less susceptible to deterioration but without having its taste or nutritive or digestive qualities impaired.

It is well known that nascent oxygen and ozone have a very destructive effect on micro-organisms and attempts have been made to industrially apply nascent oxygen for such purposes by the employment of peroxid of hydrogen either directly or by chemical action. Peroxid of hydrogen however is of an unstable character and liable to quickly deteriorate besides which its presence in any quantity other than a trace is undesirable, and moreover it does not effectively sterilize except in undesirable quantities. The substances employed in this invention are stable at ordinary temperatures when kept in tubes away from moisture and air and by the use of this invention the object mentioned above can be attained in respect of many alimentary substances, and the excess of hydrogen peroxid, if any, is a minimized amount, and is so controlled that it is a secondary consideration to the production of oxygen to the maximum amount. For instance, alkalis, heat, ferments, catalysts, reducing agents and a low pressure are agencies which promote the decomposition of hydrogen peroxid and act against its formation, whereas in prior proposed processes the conditions which obtained both as regards method and material were such as to favor the production of hydrogen peroxid to the maximum degree, the use of hermetically sealed vessels with slow action materials tending not only to produce a maximum of hydrogen peroxid, but also preventing the decomposition of the hydrogen peroxid molecule. This is responsible for a considerable excess of hydrogen peroxid in the resultant product, which is exceedingly difficult of removal. Moreover, the production of solid precipitates in milk, beverages, and alimentary substances generally is disadvantageous on commercial and physiological grounds and the production of soluble matters is eminently necessary.

It is desirable that the process be carried out in vessels wherein the substance under treatment is protected from contamination during and after the operation and that the process be conducted under atmospheric pressure, a condition which favors the breaking down of the hydrogen peroxid molecule into water and oxygen.

I have found that by the introduction into the substances to be treated of a small proportion of the peroxid of such an alkali metal or alkaline earth metal as may without injurious or detrimental effect be introduced into the substances to be treated so that reaction will ensue with acids in the substances to be treated and (or) with one of the acids allowable to be introduced under the process hereinafter set forth and by the adoption of the process as hereinafter directed the destruction can be achieved of the micro-organisms in milk and cream and in some other alimentary substances in such a manner as to enable the substance treated to be received by the consumer in a sterilized condition free from contamination and less susceptible to deterioration and without impairing the taste or nutritive or digestive qualities of such substances.

Described in general terms my process is as follows: A very small proportion of sodium peroxid as previously mentioned but preferably sodium peroxid is gradually added to the substance for treatment and is thoroughly mingled therewith by constant stirring or agitation for the purpose of rapidly producing nascent oxygen and (or) ozone when heated in a vessel under ordinary atmospheric pressure. Unless the substance under treatment contains sufficient acid to neutralize or almost neutralize the alkali in the peroxid, an amount of some suitable acid (that is to say, an acid which when combined with the base of the peroxid will yield a salt which in the amount produced will have no injurious or detrimental effect upon the substance under treatment) such as citric phosphoric carbonic or sulfuric should be added. The substance under treatment should then be gradually warmed to and maintained at a temperature exceeding 30° C. and which may require to be varied in accordance with the nature and quality of such substance and for a period of time which may also require to be varied in like manner. The temperature should not be allowed to rise to a degree which would prejudicially affect the taste or impair the nutritive or digestive qualities of the substance under treatment, but subject to this condition should be as high as practicable. The amount of peroxid used must be as nearly as possible just sufficient to generate the requisite quantity of nascent oxygen and (or) ozone to destroy the micro-organisms in the substance under treatment. Should the acid naturally present in the substance to be treated be sufficient to fully neutralize or more than neutralize the alkali in the peroxid introduced carbonate of soda or the like may sometimes be used with good effect to reduce the acidity.

The process may be varied by first warming the substance to be treated before adding any of the materials and applying the process as described above.

Having in general terms described the process I will now more particularly describe its application in certain particular cases: In the case of milk gradually add from about 0.05 per cent. to about 0.15 per cent. by weight (in proportion to the degree of deterioration of the milk) of sodium peroxid with constant stirring. If the milk after such addition and stirring is alkaline, immediately add an amount of citric or other suitable acid as mentioned above, in quantity just sufficient to almost neutralize the alkalinity. The degree of alkalinity of the milk may be determined by titration and the quantity of acid required calculated from the chemical reaction. If the milk to be treated is free from acid and citric acid is employed in the process, 1.6 parts of citric acid to every part of sodium peroxid should be added as the sodium peroxid will thus be very slightly in excess. The milk should be placed in suitable vessels open to atmospheric pressure but as far as practicable protected from contamination in such a manner that air or gases can freely enter or leave the vessel, but all microbes are precluded from contaminating the liquid both during and subsequent to the process. The substance is accordingly treated at atmospheric pressure and the use of hermetically sealed vessels is thereby obviated. The milk is then gradually warmed by any suitable means to a temperature approximating to but preferably not exceeding 52° C., and maintained at that temperature for thirty minutes or more according to the degree of deterioration in the milk. The prolongation of the time for which the temperature is maintained for even four or five hours would not prejudicially affect the working of the process. The warming of the milk to the temperature mentioned above may, if preferred, immediately precede the application of the process. The presence of lactic or other acid if any in the milk to be treated will dispense with the necessity for the artificial addition of acid to an extent equivalent to the amount of lactic or other acid present.

In the case of cream the treatment is the same as above described for milk. If the cream has been ripened prior to the treatment the addition of acid will be rendered unnecessary by reason of the presence of lactic acid in the ripened cream.

In the case of grape juices, fruit juices, fruit pulp, beer, aerated waters and other beverages the treatment is also substantially the same as for milk, the amount of sodium peroxid used being approximately .05 per cent., and again the use of acid is unnecessary if present in sufficient quantity in the product treated.

It will be well understood that in lieu of sodium peroxid, potassium peroxid, or such other equivalent alkaline peroxid may be used as well in the presence of an acid when heated rapidly produce nascent oxygen and (or) ozone, and have no injurious or detrimental effect on the substance under treatment.

Having now fully described and ascertained my said invention and the manner in which it is to be performed, I declare that what I claim is:—

1. In the sterilization of alimentary liquids, treating such liquids at atmospheric pressure by gradually adding thereto and thoroughly mingling therewith a small proportion of sodium peroxid, and heating the said substance substantially as herein set forth.

2. In the sterilization of alimentary liquids, treating such liquids at atmospheric pressure by gradually adding thereto and thoroughly mingling therewith small proportions of sodium peroxid and an acid, and heating the said substance, substantially as herein set forth.

3. The improvements in and relating to the sterilization of alimentary liquids by the production therein of nascent oxygen and ozone without the production of hydrogen peroxid to a prejudicial or undesirable extent in the manner herein specified.

In testimony whereof I have hereunto set my hand in presence of two subscribing witnesses.

ALFRED RUTTER.

Witnesses:
 EDWARD N. WATERS,
 WILLIAM G. HOLDEN.